3,215,596
BACTERICIDAL AND FUNGICIDAL COMPOSITIONS CONTAINING NITROGENOUS CONDENSATION PRODUCTS
Clarence L. Moyle, Clare, and Robert L. Johnson, Midland, Mich., assignors to The Dow Chemical Company, Midland, Mich., a corporation of Delaware
No Drawing. Filed Oct. 23, 1961, Ser. No. 147,066
3 Claims. (Cl. 167—31)

This is a continuation-in-part of our prior applications Serial No. 795,316, filed February 25, 1959, and Serial No. 830,987, filed August 3, 1959, both abandoned, which latter applications are continuations-in-part of Serial Nos. 712,610 and 712,686 respectively, both filed February 3, 1958, and now abandoned.

This invention relates to new and improved compositions for use in coating compositions, oil and latex paint compositions and cellulosic materials to provide degradation resistant properties.

The control of microorganisms is a persisting problem. The wide variety of organisms and the diverse conditions and situations where control is necessary present problems which preclude a simple solution. Preservative needs are found in the textile, paper, food, wood, coatings and paint fields. For example, it is known that coating compositions are subject to bacterial and fungal attack. Many preservatives have been employed but have been found to undergo diminution in activity or reduction in killing power upon storage or standing on the shelf. This is of particular importance in paint compositions which may be subject to frequent repeated contamination by opening of containers, insertion of brushes, exposure to dust and other sources. High concentration of preservative affects the brushing and spreading characteristics of the paint compositions or otherwise confers undesirable properties to the films formed therefrom.

Films formed from coating compositions are subject to mildew collection, that is, a phenomenon of the coating or film manifest by the presence of mold or fungus growth. Such attack results in eventual failure of paint or varnish film brought about by consumption of oil components or change in chemical composition of paint constituents by the microorganisms, pH change due to metabolic by-product formation, or discoloration by accumulation of mycelia and spores thereon. Furthermore, such growth frequently works under the film through abrasions and cracks producing deterioration of the structures underneath. Many fungicidal agents which have been suggested for inclusion in oil paints and films react with oils and pigments causing discoloration or fading thereof. Others act as antioxidants and antisiccatives thereby slowing the drying rate. The protective effects produced by certain fungicidal agents are transitory since they vaporize or are otherwise dissipated out of the composition upon weathering. Certain others are decomposed by light and air.

Wood and wood products such as lumber employed in frame building constructions, poles or posts are subject to fungal attack manifest by surface growth which is followed by deterioration and loss of the wood. Many preservatives currently employed are subject to loss or inactivation on standing for long periods, particularly on exposure to high humidity or persistently damp conditions. Certain preservatives are undesirable because they bleed or crystallize (bloom) on the surfaces. Other cellulosic materials such as paper and textiles are also susceptible to microbially induced degradation. Where conditions of high humidity and temperature accelerate microbial growth, obnoxious and musty odors are frequently found to be produced.

Halophenols are widely used as preservatives because of their broad antimicrobial activity and relatively desirable properties such as low toxicity to higher animals, mild corrosiveness, relatively pleasant odor and lack color, properties which are present to a high degree in other preservatives such as organic mercury compounds and organo-sulfur compounds. However, the preservative activity is frequently inadequate, microbial growth and/or deterioration setting in, particularly if subject to weathering conditions or to standing over extended periods. Frequently a relatively large amount of preservative agent will provide adequate protective action but this preservative effectiveness is generally accomplished by impartation of undesirable properties to the material or system being treated. Furthermore, in most instances it is difficult, if not impossible, to reapply a preservative composition. These and similar problems have not been solved by the alternative of employing salts of halophenols. Thus, the alkali metal salts or their lower amine salts are found to have similar limitations as the halophenols themselves, frequently requiring high concentration to obtain preservation and further have an additional limitation of increased solubility in water, rendering them useless in applications where exposure to high humidity or water may be encountered. Other salts such as lead and copper salts have limitations such as extremely low solubility rendering compounding difficult or high color as in the case of copper salts or ready reactivity with hydrogen sulfide as in the case of lead salts. Thus, it is clear that there exists a need for an antimicrobial agent that is effective at low concentration and is resistant to diminution of its antimicrobial action.

It has been discovered that a new, active antimicrobial composition may be constituted by a physical mixture of (1) a halophenol compound and (2) a condensation product of a polyamine with a lower aliphatic aldehyde. This composition when employed for antimicrobial uses prevents the growth of microorganisms at a concentration considerably less than that required when employing either component alone. This mixture of reagents is particularly valuable from the standpoint of decreasing substantially the amount of halophenol compound necessary in many compositions. The incorporation of a polyamine-aliphatic aldehyde condensation product in an amount of as little as $\frac{1}{15}$ part by weight for each part by weight of halophenol compound provides an improved composition which affords a protective action otherwise obtained only by using two to three times as much of the halophenol compound when said compound is employed alone. Moreover, this antimicrobial effectiveness is of more lasting duration than that of either component alone even under rigorous conditions of temperature and humidity. Thus, the present composition gives substantially complete protection to the system to be preserved even when the latter is subjected to such rigorous conditions that no protection is afforded by either halophenol compound or condensation product when employed alone.

Furthermore, the new composition confers substantially no undesirable properties to the treated system.

By the expression "halophenol compound" as herein employed is meant halophenols as hereinafter defined and water-soluble salts thereof. The halophenols suitable for the practice of this invention are halogenated monohydric phenols and embrace halogenated parasiticidal phenols including alkyl and phenyl substituted phenols which have been chlorinated or brominated. Halophenols of particular value in the practice of this invention are those defined by the structure

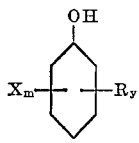

wherein R is a substituent selected from the group consisting of methyl and phenyl, each X is at least one of bromine and chlorine, $y$ is 0 or 1, and $m$ is an integer of from 1 to $(5-y)$, inclusive. Suitable halophenols are those having mixed chlorine and bromine as well as those having a single halogen species and include 2-bromo-4-chlorophenol,
2-bromo-4,6-dichlorophenol,
2,6-dibromo-4-chlorophenol,
2-chloro-4-phenylphenol,
2,3,4-trichlorophenol,
2,3,6-trichlorophenol,
2,4,5-trichlorophenol,
4-bromophenol,
2-bromophenol,
2,4-dibromophenol,
4-chloro-m-cresol,
2-chloro-4,6-dibromophenol,
pentachlorophenol,
pentabromophenol,
2,3,5,6-tetrachlorophenol,
2,3,4,5-tetrachlorophenol,
2,3,5,6-tetrachloro-p-cresol,
3,4,5,6-tetrabromo-o-cresol,
2,4,6-trichlorophenol,
3,4-dichlorophenol,
2,3-dichlorophenol,
2,5-dichlorophenol,
2,6-dichlorophenol,
2,4-dichlorophenol,
2,3,6-tribromo-p-cresol,
2,4,6-trichloro-m-cresol,
2,4,6-tribromo-m-cresol,
4-chlorophenol,
3-chlorophenol,
2-chlorophenol,
4,6-dibromo-o-cresol,
2,5-dibromo-p-cresol,
3,6-dibromo-2-chloro-p-cresol,
2-bromo-4-phenylphenol,
4-bromo-2-phenylphenol and
4-chloro-2-phenylphenol.

When the compositions of the present invention are employed in aqueous system or can be applied employing aqueous treating compositions, water-soluble salts of the halophenols may be employed instead of the parent halophenol. Particularly suitable are the alkali metal, ammonium and amine salts such as potassium, sodium, lithium, ammonium, ethanolamine, methylamine, ethylamine, trimethylamine, propylamine, isopropanolamine, triethanolamine, etc.

The "polyamine-aliphatic aldehyde" condensation product employed in the practice of this invention may be defined as (a) a product obtainable by the reaction of from about 1.5 to 3.5 molar proportions of a lower aliphatic aldehyde containing from 1 to 4 carbon atoms with one molar proportion of an aliphatic polyamine having the structure.

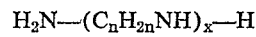

wherein $n$ is an integer of from 2 to 3, inclusive, and $x$ is an integer of from 1 to 4, inclusive, or (b) a product obtainable by the reaction of from about 0.8 to 1.5 molar proportions of formaldehyde with 1 molar proportion of a piperazine compound having the structure

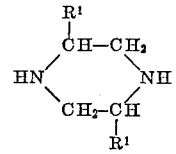

wherein each $R^1$ is methyl or hydrogen. Suitable "aliphatic polyamines" include ethylene diamine, diethylene triamine, triethylene tetramine, tetraethylene pentaamine, dipropylene triamine, tripropylene tetramine and tetrapropylene pentamine or mixtures thereof. Suitable "piperazine compounds" include piperazine, trans-2,5-dimethylpiperazine, 2-methylpiperazine or cis-2,5-dimethylpiperazine. Suitable "aliphatic aldehydes" for reaction with aliphatic polyamines include formaldehyde, acetaldehyde, propionaldehyde, isobutyraldehyde and butyraldehyde.

The condensation product to be employed in the practice of the present invention may be prepared by intimately mixing the appropriate polyamine and aldehyde preferably with cooling and agitation. The reaction occurs with some evolution of heat and with the formation of the desired condensation product and water of reaction. The temperature for carrying out the reaction should be below about 100° C. When aliphatic polyamines are caused to react with aliphatic aldehydes it is essential to maintain the temperature below about 60° C., preferably between from about 40° to 50° C. The rate of combining the reactants is dependent upon the initial temperature and the efficiency of cooling. The reaction is preferably carried out in water or polar solvent such as lower alcohols. The aldehyde may be employed in any form. Thus, the aldehyde, if formaldehyde, may be employed as its commercially available 36–38 percent aqueous solution or as paraformaldehyde. The condensation products resulting from the reaction of aliphatic polyamines and aliphatic aldehydes are clear, viscous, colorless or light-colored compositions which may be somewhat gelatinous. They are miscible with water and/or polar solvents such as alcohols, glycols, glycol ethers, acetone, etc. They may be recovered as anhydrous solids by vaporizing that water or alcohol under reduced pressure while maintaining the temperature about 60° C. The products resulting from the reaction of piperazine compounds with formaldehyde are white amorphous solids which may be recovered from the reaction mixture by filtration. The products are soluble in dilute aqueous acid or mixtures thereof with polar solvents such as alcohols, glycols, glycol ethers, acetone, etc.

For the successful practice of this invention, it is desirable that the condensation product prepared as above described be present in an amount of at least $\frac{1}{12}$ by weight of the amount of halophenol employed, although in many instances the amount of $\frac{1}{15}$ by weight is satisfactory. The lower limit is based on the weight of halophenol equivalent of the water-soluble salt when the latter is employed. The upper limit is not critical and is usually dictated by economic considerations or factors to be considered with respect to the particular system where employed. The optimum amount of the condensation product with respect to the halophenol may also vary with the particular system in which the composition of the halophenol compound is employed. For example, in non-aqueous systems, good results may be obtained when a composition is employed having a weight ratio of halophenol to condensation product from 2:1 to 15:1 with a halophenol concentration of at least 0.075 percent by weight. When the non-aqueous system is an oil paint formulation, best results are obtained when the composition is employed in a ratio of halophenol to condensation product of about 6:1 to 12:1 and with a halophenol concentration in the paint formulation of about 0.75 to about 1.5 percent by weight. In aqueous systems such as latex and latex paint compositions frequently a minimum amount of halophenol with equal or excess amount of condensation product is desirable.

The new compositions comprising (1) a halophenol compound and (2) a condensation product of a polyamine with aliphatic aldehyde as previously defined is prepared by mixing the components. The composition is preferably employed in a dispersing medium. Solvents particularly useful as dispersing media are polar solvents or mixtures of solvents in which one component is polar, such as glycol ethers, alcohols, ketones or a mixture such as hydrocarbon-ketone-alcohol mixture or ether-alcohol mixture or water-organic solvent mixture. In compositions comprising piperazine-formaldehyde condensation product, dilute aqueous acids may be added to the solvent mixture to provide complete solution. The compositions may be applied by any method normally employed in the use of halophenols or salts thereof as antimicrobial agents. Thus, the instant composition may be impregnated in the material to be treated by dipping or immersing the latter in the composition as in the case of wood and wood products, or may simply be mixed with the material to be treated as in the case of coating and paint compositions, or may be added in a step in manufacture, or sprayed or brushed onto final products. The mere application or incorporation of the composition of the present invention is sufficient to impart the desirable properties and the effectiveness thereof does not require special after-treatment procedures such as baking.

One of the many antimicrobial applications in which the composition of the present invention has found particular usefulness is in preventing microbial growth and microbially induced degradation in films formed from both oil and water base paints. Coatings and films formed from currently marketed oil and alkyd resin paint compositions which contain germicidal agents suffer from mildew growth after exposure to normal conditions of temperature and humidity, and if employed on wood surfaces the applications are followed by microbially induced degradation of the wood itself. However, compositions of the present invention when incorporated into an oil paint and the resulting modified oil paint employed to paint soft wood panels are found to give excellent control against mildew formation of the panels when the latter are exposed to very rigorous conditions of temperature and humidity. Furthermore, the control is effective for an extended period. In addition, the present compositions are useful for increasing the shelf life of coating compositions. Coating materials containing compositions of the present invention have been found to adequately prevent microbial growth.

Another application of the present invention is in the preservation of wood against fungus induced decay. Thus wood impregnated with compositions of the present invention and exposed to wood inhabiting fungi in growth promoting atmosphere, after a period of time shows little or no loss in weight from decay.

Other applications include preservation of paper and other cellulosic materials. For example, paper treated with compositions of the present invention when subjected to rigorous temperature-humidity conditions show resistance to microbial attack. Furthermore, treated material, maintained for an extended period of time and subsequently subjected to rigorous temperature-humidity conditions, show similar effective resistance to microbial attack.

In all such applications, the degree of protection control provided by compositions of the present invention was greater than that provided by either compound alone even when employed at higher concentrations.

The following examples illustrate the invention but are not to be construed as limiting.

EXAMPLE 1

An oil paint having the composition set forth below was made by intimately blending in a conventional manner oil, varnish and pigments and adding to the resulting paste, driers, solvents and water.

| | Lbs. |
|---|---|
| Iron oxide pigment | 1498 |
| Amorphous silica | 888 |
| Asbestine | 1476 |
| Spar varnish (60 percent N.V.) | 1180 |
| Linseed oil, Q bodied | 2888 |
| Mineral spirits | 626 |
| Water | 88 |
| Co drier (6 percent) | 28 |
| Pb drier (24 percent) | 70 |
| Mn dried (6 percent) | 11 |
| | 8153 |

Compositions comprising (1) halophenol and (2) polyaminealdehyde condensation product in varying ratio of halophenol to condensation product were prepared employing propylene glycol monomethyl ether as primary solvent. In certain of the compositions, a small amount of water was added. A typical composition is that comprising 2,3,4,6-tetrachlorophenol and a condensation product of 2 moles of formaldehyde and 1 mole of diethylene triamine wherein the ratio of halophenol to condensation product is 12:1.

| Component: | Weight percent |
|---|---|
| 2,3,4,6-tetrachlorophenol | 30 |
| Diethylenetriamine - formaldehyde product (1:2) [1] | 2.5 |
| Propylene glycol monomethyl ether | 64.8 |
| Water | 2.7 |

[1] Figures indicated in parentheses above and in subsequent examples represent the moles of polyamine and aldehyde, respectively, employed in the preparation of the condensation product.

Above composition and other similar compositions varying in the ratio of halophenol to condensation product were prepared. These compositions were added to and intimately admixed with an oil paint composition above described to produce modified paint compositions, each containing a different antimicrobial composition, in an amount sufficient to provide a halophenol at a concentration of 1 percent by weight.

The modified paint compositions were then applied to panels of ponderosa pine. The painted panels were allowed to dry by standing for 2 to 3 days at room temperature. A second coat was then applied and the panels allowed to dry by standing for 5 days at room temperature. After drying, the panels were placed in a tropical chamber maintained at 88° F. and 95 percent relative humidity. After four weeks, the panels were visually evaluated for the amount of mildew growth and compared with check panels painted with unmodified paint. The check panels showed very heavy mildew growth wherein the surface of the panel was completely covered. The results obtained expressed as control of mildew growth are shown in Table I.

Table 1

| Halophenol | Condensation Product (Polyamine/aldehyde) | Ratio Halophenol/Condensation Product | Control of Mildew Growth |
| --- | --- | --- | --- |
| 2,3,4,6-tetrachlorophenol | Diethylenetriamine-formaldehyde (1:2) | 12:1 | Excellent. |
| Do | Triethylenetetramine-formaldehyde (1:2.4) | 6:1 | Do. |
| Do | Tetraethylenepentaamine-formaldehyde (1:2) | 6:1 | Do. |
| Do | ...do... | 12:1 | Do. |
| Do | Diethylenetriamine-acetaldehyde (1:2.5) | 6:1 | Good. |
| Do | 3,3'-diaminodipropylamine-formaldehyde (1:2) | 4:1 | Excellent. |
| Do | 3,3'-diaminodipropylamine-acetaldehyde (1:2) | 6:1 | Good. |
| Do | 3,3'-diaminodipropylamine-butyraldehyde (1:2) | 4:1 | Excellent. |
| Do | Ethylenediamine-formaldehyde (1:2) | 4:1 | Do. |
| Pentachlorophenol | Diethylenetriamine-formaldehyde (1:2) | 6:1 | Good. |
| Do | Triethylenetetramine-formaldehyde (1:2.4) | 12:1 | Excellent. |
| Tetrachlorocresol [1] | Diethylenetriamine-formaldehyde (1:2) | 6:1 | Do. |
| Do | ...do... | 12:1 | Do. |
| Do | 3,3'-diaminodipropylamine-formaldehyde (1:2) | 6:1 | Good. |
| 2,4,5-trichlorophenol | Diethylenetriamine-formaldehyde (1:2) | 4:1 | Excellent. |
| Do | 3,3'-diaminodipropylamine-formaldehyde (1:2) | 6:1 | Do. |
| None (Check) | None | | None. |

[1] In above and subsequent examples "tetrachlorocresol" is a mixture of 50 percent tetrachloro-m-cresol, 22 percent tetrachloro-o-cresol and 15 percent tetrachloro-p-cresol.

EXAMPLE 2

In a similar operation, the effect of varying the total amount of a composition comprising (1) a halophenol and (2) a condensation product while maintaining the ratio of the components constant was determined and compared with the effect of incorporating a similar amount of one of the components. A composition having the following components was prepared.

Component: Percent by weight
- 2,3,4,6-tetrachlorophenol —————————— 30
- Diethylentriamine-formaldehyde (1:2) —————— 5
- Water ——————————————————— 5.4
- Propylene glycol monomethyl ether —————— 59.6

The composition (ratio of halophenol to condensation product, 6:1) was incorporated in the oil paint having the composition described in Example 1 at levels to provide a concentration of 2,3,4,6-tetrachlorophenol of 0.75 percent and 1.5 percent in the paint. In concurrent operations, oil paint was modified by the addition of one component. Thus, a treating composition of 30 percent 2,3,4,6-tetrachlorophenol in propylene glycol monomethyl ether was added to paint at a level of 1 percent and 3 percent. Another treating composition of 30 percent diethylenetriamine-formaldehyde (1:2) condensation product in aqueous propylene glycol monomethyl ether was added to paint at a level of 1 percent. Panels were painted, dried and placed in a tropical chamber for 3 weeks and examined visually for the amount of mildew growth. The results are given in Table II.

Table II

| Percent 2,3,4,6-tetrachlorophenol in Paint Composition | Percent Diethylenetriamine-Formaldehyde Condensation Product in Paint Composition | Amount of Mildew Growth |
| --- | --- | --- |
| 0.75 | 0.125 | None. |
| 1.5 | 0.25 | Do. |
| 1.0 | None | Heavy. |
| 3.0 | None | Moderate. |
| None | 1.0 | Very heavy. |
| None | None | Do. |

EXAMPLE 3

In similar operations, various compositions comprising (1) halophenol and (2) polyamine-aldehyde condensation product were prepared in propylene glycol monomethyl ether with or without added water. These compositions were similar to those previously described and contained 30 percent by weight of the halophenol. The compositions were incorporated into oil paint samples having composition described in Example 1 to provide modified paint compositions containing 1 percent by weight of halophenol. In concurrent operations, other paint samples were modified with either halophenol or polyamine-aldehyde condensation product in propylene glycol monomethyl ether. Wood panels were painted with modified paint as well as unmodified paint as check. The panels were then exposed to the conditions of the tropical chamber for three weeks as described in Example 1 and examined visually for mildew growth and compared with check panels painted with unmodified paint. The results are given in Table III.

EXAMPLE 4

In a similar manner, compositions comprising (1) 2,3,4,6-tetrachlorophenol and (2) piperazine-formaldehyde condensation product in propylene glycol monomethyl ether were prepared. The ratios of 2,3,4,6-tetrachlorophenol to the condensation product in the compositions were 6:1 and 4:1. These compositions were mixed with oil paint previously described to produce modified paint compositions containing the halophenol in a concentration of 1 percent by weight. Other samples of oil paint were modified by the addition of 2,3,4,6-tetrachlorophenol in propylene glycol monomethyl ether to provide modified paint compositions containing the halophenol in a concentration of 1 percent and 2 percent.

*Table III*

| Halophenol | Percent by Weight | Condensation Product (Polyamine-Aldehyde) | Percent by Weight | Ratio Halophenol/Condensation Product | Control of Mildew Growth |
|---|---|---|---|---|---|
| 2,4,5-trichlorophenol | 1.0 | Dipropylenetriamine-formaldehyde (1:2.5). | 0.1 | 10:1 | Good. |
| 2-chloro-4-phenyl-phenol | 1.0 | ____do____ | 0.1 | 10:1 | Do. |
| 4-bromophenol | 1.0 | ____do____ | 0.1 | 10:1 | Do. |
| | 0.0 | ____do____ | 1.0 | | None. |
| 2-chloro-4-phenyl-phenol | 1.0 | Diethylenetriamine-formaldehyde (1:2). | 0.1 | 10:1 | Excellent. |
| 4-bromophenol | 1.0 | ____do____ | 0.08 | 12:1 | Good. |
| 2-chloro-4,6-dibromophenol | 1.0 | ____do____ | 0.17 | 6:1 | Excellent. |
| | 0.0 | ____do____ | 1.0 | | None. |
| 2,4,5-trichlorophenol | 1.0 | | 0.0 | | Do. |
| 2-chloro-4-phenyl-phenol | 1.0 | | 0.0 | | Do. |
| 4-bromophenol | 1.0 | | 0.0 | | Do. |
| Check | 0.0 | | 0.0 | | Do. |

The modified paint compositions as well as unmodified paint were then applied to pine panels, the panels dried, then placed in a tropical chamber for four weeks and thereafter visually evaluated. The results are given in Table IV.

*Table IV*

| Percent 2,3,4,6-tetrachlorophenol in Paint Composition | Percent Piperazine-Formaldehyde Condensation Product in Paint Composition | Inhibition of Growth |
|---|---|---|
| 1.0 | 0.167 | Yes. |
| 1.0 | 0.25 | Yes. |
| 1.0 | 0.00 | No. |
| 2.0 | 0.00 | No. |
| 0.0 (Check) | 0.00 | No. |

EXAMPLE 5

In a manner similar, various compositions comprising (1) halophenol and (2) a piperazine-formaldehyde condensation product were prepared in aqueous propylene glycol monomethyl ether. A typical composition is the following.

Component: Weight percent
2-chloro-4-phenylphenol _____ 15
Trans - 2,5 - dimethylpiperazine–formaldehyde (1:1) _____ 2.5
Water, acidified with hydrochloric acid _____ 18
Propylene glycol monomethyl ether _____ 64.5

These compositions were then incorporated into oil paint in an amount sufficient to provide 1 percent by weight of the halophenol. In concurrent operations, oil paint was modified with either a halophenol or a piperazine-formaldehyde condensation product in propylene glycol monomethyl ether at a level to provide 1 percent by weight of a halophenol or a piperazine-formaldehyde condensation product in the paint. Panels were then painted with modified paint and dried as previously described. Check panels were painted with unmodified paint. The panels were exposed to the conditions of the tropical chamber for 3 weeks and thereafter examined visually for mildew growth and compared with check panels. The results are given in Table V.

*Table V*

| Halophenol | Percent by Weight | Condensation Product (Piperazine-Aldehyde) | Percent by Weight | Ratio Halophenol/Condensation Product | Control of Mildew Growth |
|---|---|---|---|---|---|
| 2-chloro-4-phenylphenol | 1 | Trans-2,5-dimethylpiperazine-formaldehyde (1:1). | 0.167 | 6:1 | Excellent. |
| p-Bromophenol | 1 | ____do____ | 0.1 | 10:1 | Good. |
| Tetrachlorocresol | 1 | ____do____ | 0.167 | 6:1 | Excellent. |
| | | ____do____ | 1.0 | | None. |
| 2-chloro-4-phenylphenol | 1 | Piperazine-formaldehyde (1:1). | 0.167 | 6:1 | Excellent. |
| | | ____do____ | 1.0 | | None. |
| 2-chloro-4-phenophenol | 1 | | 0.0 | | Do. |
| p-Bromophenol | 1 | | 0.0 | | Do. |
| Tetrachlorocresol | 1 | | 0.0 | | Do. |
| Check | 0.0 | | 0.0 | | Do. |

EXAMPLE 6

A composition comprising tetrachlorocresol and diethylenetriamine-formaldehyde condensation product in a ratio of 12:1 was incorporated in oil paint previously described at a level to provide 1 percent by weight of halophenol. The modified paint was employed to paint pine panels and the panels exposed in a tropical chamber as previously described for 4 weeks. Excellent control of mildew growth was obtained. Comparable control was obtained with tetrachlorocresol alone only when the concentration of the tetrachlorocresol was increased to 3 percent by weight.

EXAMPLE 7

In similar operations, various compositions comprising (1) halophenol and (2) condensation product are prepared in propylene glycol monomethyl ether with or without added water.

The following compositions are prepared to contain 15 percent by weight of the halophenol:

| Halophenol | Condensation Product | Ratio Halophenol/Condensation Product |
|---|---|---|
| 2-chloro-4,6-dibromophenol | Trans-2,5-dimethyl-piperazine-formaldehyde (1:1). | 10:1 |
| Pentabromophenol | ____do____ | 6:1 |
| 2,3,4,5-tetrabromophenol | ____do____ | 4:1 |
| 2,4,6-tribromo-m-cresol | ____do____ | 8:1 |
| 2,3,5,6-tetrachloro-p-cresol | Piperazine-formaldehyde (1:1). | 8:1 |
| 3,4-dichlorophenol | ____do____ | 2:1 |
| 2,4,6-tribromophenol | ____do____ | 4:1 |
| Pentachlorophenol | ____do____ | 5:1 |
| 2-bromo-4,6-dichlorophenol | 2-methylpiperazine-formaldehyde (1:1). | 8:1 |
| 3-bromo-2,4,5-trichlorophenol | ____do____ | 10:1 |
| 2-bromo-3,4,6-trichlorophenol | ____do____ | 6:1 |
| 2-bromo-4-phenylphenol | ____do____ | 5:1 |

The following compositions are prepared to contain 30 percent by weight of halophenol:

| Halophenol | Condensation Product | Ratio Halophenol/ Condensation Product |
|---|---|---|
| 2,3,4,5-tetrabromophenol | Diethylenetriamine-formaldehyde (1:2.0). | 12:1 |
| Do | Ethylenediamine-propionaldehyde (1:1.5). | 8:1 |
| 2,4,6-tribromo-m-cresol | Tetraethylenepentaamine-formaldehyde (1:3.5). | 10:1 |
| 2,4,6-trichloro-m-cresol | Triprophlenetetramine-formaldehyde (1:2.5). | 8:1 |
| Do | Diethylenetriamine-formaldehyde (1:2.5). | 10:1 |
| 2,3,5,6-tetrachloro-p-cresol | Diethylenetriamine-formaldehyde-butyraldehyde (1:2:0.5). | 12:1 |
| 3,4-dichlorophenol | Diethylenetriamine-butyraldehyde (1:2.5). | 10:1 |
| 2,4,6-tribromophenol | Diethylenetriamine-butyraldehyde-formaldehyde (1:2:0.5). | 12:1 |

Each of the above compositions are separately incorporated into commercial oil paint compositions at a level sufficient to provide modified paint compositions containing 1.5 percent by weight of the halophenol component. Wood panels are painted with the modified paint compositions as well as with modified paint and exposed in a tropical chamber for 2 weeks. The panels are then visually examined as previously described. Panels painted with modified paint compositions show substantially no mildew formation whereas panels painted with unmodified paint show heavy mildew growth.

EXAMPLE 8

A treating composition comprising (1) 2,3,4,6-tetrachlorophenol and (2) piperazine-formaldehyde (1:1) condensation product in a ratio of phenol to condensation product of 10:1 and containing 15 percent by weight of the chlorophenol is prepared in propylene glycol monomethyl ether. The composition is intimately mixed with oil paint to provide modified oil paint containing above composition in varying concentrations. Other samples of oil paint are modified with a 15 percent solution of 2,3,4,6-tetrachlorophenol in propylene glycol monomethyl ether or with a 15 percent solution of piperazine-formaldehyde condensation product in aqueous acidic propylene glycol monomethyl ether in varying concentrations. The modified oil paint samples are as follows:

| Paint Sample | Concentration of 2,3,4,6-tetrachlorophenol in Weight Percent | Concentration of Condensation Product in Weight Percent |
|---|---|---|
| 1 | 0.75 | 0.075 |
| 2 | 1.0 | 0.1 |
| 3 | 1.5 | 0.15 |
| 4 | 1.0 | 0.0 |
| 5 | 3.0 | 0.0 |
| 6 | 0.0 | 1.0 |

The modified oil paint samples as well as unmodified paint are applied to panels of ponderosa pine and placed in a tropical chamber as previously described. The panels are examined visually at the end of one week and at the end of four weeks. At the end of one week, panels painted with Samples 1, 2, 3 and 5 show no mildew growth. Panels painted with Samples 4, 6 and unmodified paint show mildew growth. At the end of four weeks, panels painted with Samples 1, 2 and 3 show no mildew growth, panels painted with Sample 5 show moderate mildew growth and panels painted with Samples 4, 6 and unmodified paint show heavy mildew growth.

EXAMPLE 9

An operation similar to Example 8 is carried out wherein the composition comprises 2,3,4,6-tetrachlorophenol and dipropylenetriamine-formaldehyde (1:2.5) condensation product and wherein the level of the phenol is 30 percent. A 30 percent solution of 2,3,4,6-tetrachlorophenol in propylene glycol monomethyl ether and a 30 percent solution of dipropylenetriamine-formaldehyde in said glycol ether are also prepared. These compositions are employed to modify oil paint as follows:

| Paint Sample | Concentration of 2,3,4,6-tetrachlorophenol in Weight Percent | Concentration of Condensation Product in Weight Percent |
|---|---|---|
| 1 | 0.75 | 0.075 |
| 2 | 1.0 | 0.1 |
| 3 | 1.5 | 0.15 |
| 4 | 1.0 | 0.0 |
| 5 | 3.0 | 0.0 |
| 6 | 0.0 | 1.0 |

The paint is applied to panels as previously described and the panels examined visually at the end of one week and at the end of four weeks. At the end of one week, panels painted with Samples 1, 2, 3 and 5 show no mildew growth. Panels painted with Samples 4, 6 and unmodified paint show mildew growth. At the end of four weeks, panels painted with Samples 1, 2, and 3 show no mildew growth, panels painted with Sample 5 show moderate mildew growth and panels painted with Samples 4, 6 and unmodified paint show heavy mildew growth.

EXAMPLES 10

Compositions comprising varying ratios of (1) pentachlorophenol and (2) condensation production of 1 mole of diethylenetriamine and 2.5 moles of formaldehyde were prepared by mixing the appropriate amount of pentachlorophenol in isopropyl alcohol with an aqueous solution of a condensation product of 2.5 moles of formaldehyde and 1 mole of diethylenetriamine. The following compositions were prepared:

COMPOSITION 1.—HALOPHENOL+CONDENSATION PRODUCT IN RATIO OF 1:1

Grams
Condensation product _____ 10
Pentachlorophenol _____ 10
Water _____ 15
Isopropyl alcohol _____ 65

COMPOSITION 2.—HALOPHENOL+CONDENSATION PRODUCT IN RATIO OF 6:1

Condensation product _____ 2
Pentachlorophenol _____ 12
Water _____ 3
Isopropyl alcohol _____ 53

COMPOSITION 3.—HALOPHENOL+CONDENSATION PRODUCT IN RATIO OF 1:4

Condensation product _____ 20
Pentachlorophenol _____ 5
Water _____ 30
Isopropyl alcohol _____ 70

In separation operations, the above compositions as well as a composition of pentachlorophenol and a composition of the condensation product of 2.5 moles of formaldehyde and 1 mole of diethylenetriamine were incorporated in latex paint samples to produce modified latex paint compositions.

The latex paint employed for this operation was made by intimately blending a pigment dispersion having the following composition:

Parts by weight
Titanium dioxide _____ 250
Clay _____ 50
Calcium carbonate _____ 50
Diatomaceous earth _____ 25
Potassium tripolyphosphate _____ 1.5
Water _____ 270 with a 48 percent solids content synthetic latex composition comprising a copolymer of 60 percent styrene and 40 percent butadiene.

100 gram samples of modified latex paint compositions were inoculated with 0.5 milliliter of a 24 hour culture of a mixture of organisms consisting largely of the Pseudomonas, Aerobacter and Proteus species previously isolated from spoiled samples of α-protein, latex or latex paint. The inoculated samples were incubated for 24 hours at 37° C. The incubated samples were then streaked on nutrient agar plates and the streaked plates incubated at 37° C. for 72 hours. Thereafter the plates were examined for microbial growth and the results were as given in Table VI.

*Table VI*

| Sample Modified With | Total Concentration (Percent Weight) | Percent Weight Pentachlorophenol | Percent Weight Condensation Product | Results |
|---|---|---|---|---|
| Pentachlorophenol | 0.4 | 0.4 | 0.0 | Heavy growth. |
| Diethylenetriamine-formaldehyde (1:2.5). | 0.2 | 0.0 | 0.2 | Slight growth. |
| Composition 1 | 0.1 | 0.05 | 0.05 | None. |
| Composition 2 | 0.1 | 0.086 | 0.014 | Do. |
| Composition 3 | 0.1 | 0.02 | 0.08 | Do. |
| Control | 0.0 | 0.0 | 0.0 | Heavy growth. |

EXAMPLE II

Operations were carried out in a manner similar to that described in Example 10, but wherein the following compositions were employed:

COMPOSITION 1. — PENTACHLOROPHENOL+PIPERAZINE-FORMALDEHYDE (1:1) CONDENSATION PRODUCT IN RATIO OF 3:1

Weight percent
Condensation product _____ 6.7
Pentachlorophenol _____ 20
Glycol ether solvent _____ 73.3

COMPOSITION 2.—PENTACHLOROPHENOL+TRANS-2,5-DIMETHYLPIPERAZINE-FORMALDEHYDE (1:1) CONDENSATION PRODUCT IN RATIO OF 2:1

Weight percent
Condensation product _____ 20
Pentachlorophenol _____ 10
Glycol ether solvent _____ 70

In separate operations, the above compositions as well as a composition of pentachlorophenol in the glycol ether solvent and a control sample of the glycol ether solvent alone were incorporated in latex paint samples to produce modified latex paint compositions. Other latex paint samples were modified by the addition of a solution of pentachlorophenol in glycol ether solvent. The latex paint samples were then inoculated and incubated and streaked as described in Example 10, and then examined visually for microbial growth at the end of 24 hours and 72 hours. The results obtained are shown in Table VII.

COMPOSITION 3. — PENTACHLOROPHENOL+PIPERAZINE-FORMALDEHYDE (1:1) CONDENSATION PRODUCT IN RATIO OF 1:4

Weight percent
Condensation product _____ 5
Pentachlorophenol _____ 20
Glycol ether solvent _____ 70

The above composition is incorporated in latex paint to produce modified latex paint compositions and the latter as well as unmodified latex paint samples are inoculated, incubated, streaked and incubated as previously described. On examination at the end of 72 hours, the plates streaked with modified latex paint show no microbial growth whereas plates streaked with unmodified paint show prolific microbial growth.

EXAMPLE 13

In an operation similar to that described in Examples 10–12, a treating composition was prepared wherein the halophenol was employed in the form of a water-soluble salt. The ratio of halophenol salt to condensation product was 1:2. The treating composition was prepared by mixing the following components:

Weight percent
Diethylenetriamine-formaldehyde (1:2.2) condensation product _____ 28.6
Sodium pentachlorophenoxide _____ 14.3
Methanol _____ 16.2
Water _____ 40.9

The composition was incorporated into latex paint to produce modified paint compositions. Other latex paint samples were modified by the addition of an aqueous solution of either sodium pentachlorophenoxide or diethylenetriamine - formaldehyde condensation product alone. The latex paint employed was that having the composition described in Example 10 and having a pH of near 9. A portion of the latex paint had the pH adjusted to a lower value (7–8) by the addition of a small amount of acetic acid. The pH value of the modified as well as unmodified paint samples were recorded, then

*Table VII*

| Sample Modified with | Percent Weight Pentachlorophenol | Percent Weight Condensation Product | Results 24 Hours | Results 72 Hours |
|---|---|---|---|---|
| Composition 1 | 0.075 | 0.025 | No growth | No growth. |
| Composition 2 | 0.075 | 0.038 | do | Do. |
| Pentachlorophenol | 0.2 | | Heavy growth | do |
| Do | 0.4 | | do | do |
| Control (solvent, 2 percent) | | | do | do |
| Do | | | do | do |

EXAMPLE 12

In an operation similar to that described in Example 11 but wherein the condensation product is present in excess, a treating composition is prepared as follows:

inoculated, incubated, streaked on plates and the latter incubated as previously described and observed at the end of 24 hours and 72 hours. The results obtained were as given in Table VIII.

Table VIII

| Sample Modified With | Total Concentration (Percent Weight) | Percent Weight Sodium Pentachloro- phenoxide | Percent Weight Conden- sation Product | pH | Results 24 Hours | Results 72 Hours |
|---|---|---|---|---|---|---|
| Treating Composition | 0.05 | 0.017 | 0.033 | 7.8 |  | No growth. |
| Do | 0.05 | 0.017 | 0.033 | 8.9 |  | Do. |
| Do | 0.1 | 0.033 | 0.067 | 8.1 |  | Do. |
| Do | 0.1 | 0.033 | 0.067 | 9.0 |  | Do. |
| Do | 0.2 | 0.067 | 0.133 | 8.0 |  | Do. |
| Do | 0.2 | 0.067 | 0.133 | 9.0 |  | Do. |
| Condensation Product | 0.4 | 0.0 | 0.4 | 8.1 |  | Do. |
| Do | 0.4 | 0.0 | 0.4 | 9.2 |  | Do. |
| Sodium Pentachloro- phenoxide | 0.4 | 0.4 | 0.0 | 8.0 | Heavy growth |  |
| Do | 0.4 | 0.4 | 0.0 | 9.1 | ___do___ |  |
| Control | 0.0 | 0.0 | 0.0 | 8.0 | ___do___ |  |
| Do | 0.0 | 0.0 | 0.0 | 9.0 | ___do___ |  |

EXAMPLE 14

In an operation similar to that described in Example 13, a treating composition of the following components is prepared:

| | Weight percent |
|---|---|
| Piperazine-formaldehyde (1:1.2) condensation product | 6 |
| Sodium pentachlorophenoxide | 3 |
| Propylene glycol monomethyl ether | 20 |
| Water, acidified with hydrochloric acid | 71 |

The composition is incorporated into latex paint described in Example 10 to produce modified paint compositions in an amount sufficient to provide 0.1 percent by weight of sodium pentachlorophenoxide. Other samples of the latex paint are modified by the addition of aqueous glycol ether solution of either sodium pentachlorophenoxide or piperazine-formaldehyde condensation product at levels of 0.2 percent and 0.1 percent, respectively. The modified latex paint compositions as well as unmodified latex paint compositions are inoculated, incubated, streaked on plates and the latter incubated as previously described and observed at the end of 72 hours. The plates streaked with paint compositions modified with the above treating composition show no microbial growth whereas plates streaked with paint compositions modified with sodium pentachlorophenoxide or piperazine-formaldehyde condensation product alone show prolific microbial growth.

prepared in ester gum (anti-bloom agent) at concentrations of 0.25 and 0.50 percent by weight. These compositions were employed to treat wood as described below.

Ponderosa pine sapwood wafers were conditioned by maintaining at 70° F. and 50 percent relative humidity until a constant weight was obtained, and then impregnated with treating solution. The impregnation was carried out by placing the wafer under about 10 millimeters pressure, adding the treating agent thereon, then releasing the vacuum and allowing the wafers to remain immersed for about 10 minutes at atmospheric pressure. The impregnated wafers were again conditioned to a constant weight as previously described. The wafers were then artificially weathered to remove readily volatile and/or water-soluble materials by subjecting them to a dry-heat treatment at 80° C. for 24 hours and to a water-immersion cycle at room temperature for two days. The wafers were then blotted dry, conditioned to a constant weight as previously described. This weight represents weight of treated wood. The latter was incubated for 63 days at room temperature over (but out of contact with) mats of pure culture of Lenzites trabea established on a malt-agar medium. At the end of this period, any adhering growth was removed by brushing off, the wafers conditioned as previously described and then weighed. From these values, the weight loss due to microbially induced degradation was calculated. The results are given in Table IX.

Table IX

| Sample | Ratio Tetrachloro- phenol/Condensation Product | Concentration of Tetrachlorophenol in Treating Composition (in Weight Percent) | Concentration of Condensation Product in Treating Composition (in Weight Percent) | Weight of Treated Wood (Grams) | Weight of Wood After Incubation (Grams) | Loss in Weight (Grams) | Percent Loss in Weight |
|---|---|---|---|---|---|---|---|
| 1 | 1:2 | 0.25 | 0.50 | 5.465 | 5.405 | 0.060 | 1.10 |
| 2 | 1:2 | 0.25 | 0.50 | 5.405 | 5.290 | 0.115 | 3.13 |
| 3 | 1:2 | 0.50 | 1.00 | 6.020 | 5.885 | 0.035 | 0.58 |
| 4 | 1:2 | 0.50 | 1.00 | 5.045 | 4.950 | 0.095 | 1.88 |
| 5* |  | 0.25 |  | 4.930 | 3.000 | 1.930 | 39.15 |
| 6* |  | 0.25 |  | 5.075 | 2.760 | 2.315 | 45.62 |
| 7* |  | 0.50 |  | 5.215 | 3.325 | 1.890 | 36.24 |
| 8* |  | 0.50 |  | 5.655 | 3.375 | 2.280 | 40.32 |

*Tetrachlorophenol control; no added condensation product.

EXAMPLE 15

A concentrated composition having the following components was prepared:

| | Weight percent |
|---|---|
| 2,3,4,6-tetrachlorophenol | 20 |
| Diethylenetriamine-formaldehyde condensation product (1:2.5) | 40 |
| Propylene glycol monomethyl ether | 40 |

The concentrate composition was diluted with propylene glycol monomethyl ether to produce treating solution containing 0.25 and 0.50 percent by weight of the tetrachlorophenol.

2,3,4,6-tetrachlorophenol treating compositions were

EXAMPLE 16

Concentrate compositions were prepared as follows:

COMPOSITION A.—HALOPHENOL+CONDENSATION PRODUCT IN RATIO 1:1

| | Weight percent |
|---|---|
| Pentachlorophenol | 2.92 |
| Diethylenetriamine-formaldehyde (1:2.4) | 2.92 |
| Propylene glycol monomethyl ether | 94.16 |

COMPOSITION B.—HALOPHENOL+CONDENSATION PRODUCT IN RATIO 2:1

| | Weight percent |
|---|---|
| Pentachlorophenol | 3.00 |
| Diethylenetriamine-formaldehyde (1:2.4) | 1.50 |
| Propylene glycol monomethyl ether | 95.5 |

These compositions were diluted with propylene glycol monomethyl ether to obtain treating compositions of varying concentrations. Other treating compositions containing varying concentrations of the condensation product were also prepared. The above compositions as well as the solvent, propylene glycol monomethyl ether, were employed to treat wood blocks of southern yellow pine.

Wood blocks of about 0.4 cubic inch in volume were carefully weighed, then in a manner similar to that described in Example 15, were impregnated under about 5 millimeters pressure and retained at atmospheric pressure for 20 to 30 minutes. The impregnated blocks were blotted dry. The treated blocks were conditioned to a constant weight by maintaining at 70° F. and 50 percent relative humidity. This represents the weight of impregnated block. The blocks were then placed in covered decay chambers holding soil containing an actively growing pure culture of Lenzites trabea, and incubated at 80° F. for a period of 11 weeks. At the end of this period, the blocks were removed, loose soil or fungus growth brushed off and the blocks conditioned and weighed. The loss in weight and the percent loss in weight were calculated from the weights obtained. The results are given in Table X.

COMPOSITION E.—HALOPHENOL+CONDENSATION PRODUCT IN RATIO 8:1

| | Grams |
|---|---|
| Pentachlorophenol | 40.0 |
| Diethylenetriamine-formaldehyde (1:2.4) | [1] 9.95 |
| Propylene glycol monomethyl ether | 450.05 |

COMPOSITION F.—HALOPHENOL+CONDENSATION PRODUCT IN RATIO 12:1

| | Grams |
|---|---|
| Pentachlorophenol | 60.00 |
| Diethylenetriamine-formaldehyde (1:2.4) | [1] 9.95 |
| Propylene glycol monomethyl ether | 475.55 |

[1] The diethylenetriamine-formaldehyde (1:2:4) condensation product employed was a 50.3 percent solution in propylene glycol monomethyl ether.

These compositions as well as composition B of Example 16 were further diluted with propylene glycol monomethyl ether and the resulting treating compositions employed to treat and condition blocks of southern yellow pine in a manner described in Example 16. Certain of the blocks were subjected to a weathering treatment of 7 daily cycles, each cycle consisting of 2 hours submersion in distilled water at room temperature followed by 22 hours in an oven at 60° C. Weathered blocks were again conditioned and weighed after the treatment. Thereafter the blocks were placed in contact with the decay fungus as previously described and incubated at

Table X

| Sample | Ratio Pentachlorophenol/ Condensation Product | Concentration of Pentachlorophenol in Treating Composition in Weight Percent | Concentration of Condensation Product in Treating Composition in Weight Percent | Weight of Impregnated Block (Grams) | Weight of Block After incubation (Grams) | Loss in Weight (Grams) | Percent Loss in Weight |
|---|---|---|---|---|---|---|---|
| 1 | 1:1 | 0.292 | 0.292 | 3.285 | 3.220 | 0.065 | 1.98 |
| 2 | 1:1 | 0.153 | 0.153 | 3.570 | 3.465 | 0.105 | 2.94 |
| 3 | 2:1 | 0.30 | 0.15 | 3.560 | 3.530 | 0.030 | 0.843 |
| 4 | 2:1 | 0.15 | 0.075 | 3.140 | 3.060 | 0.080 | 2.54 |
| 5 | | 0.00 | 0.3 | 4.045 | 2.120 | 1.925 | 47.6 |
| 6 | | 0.00 | 0.15 | 3.200 | 1.540 | 1.660 | 51.8 |
| 7 | | 0.00 | 0.03 | 3.360 | 1.865 | 1.495 | 44.5 |
| 8 | | 0.00 | 0.015 | 3.340 | 1.370 | 1.970 | 59.0 |
| 9 | | 0.00 (Solvent control) | 0.00 | 3.505 | 2.110 | 1.395 | 39.3 |
| 10 | | 0.00 (Solvent control) | 0.00 | 3.105 | 1.765 | 1.340 | 43.1 |
| 11 | | 0.00 (Check) | 0.00 | 3.120 | 1.440 | 1.680 | 53.9 |
| 12 | | 0.00 (Check) | 0.00 | 3.385 | 1.550 | 1.835 | 54.3 |

EXAMPLE 17

Compositions varying the ratios of pentachlorophenol to condensation product were prepared as follows:

room temperature for 13 weeks. The results are summarized in Table XI.

Table XI

| Sample | Ratio Pentachlorophenol/Condensation Product | Concentration of Pentachlorophenol in Treating Composition (in Weight Percent) | Concentration of Condensation Product in Treating Composition (in Weight Percent) | Weight of Impregnated Blocks (Grams) | Weight of Impregnated Weathered Blocks (Grams) | Weight of Blocks After Incubation (Grams) | Loss in Weight (Grams) | Percent Loss in Weight |
|---|---|---|---|---|---|---|---|---|
| 1 | 2:1 | 0.199 | 0.0994 | 3.635 | | 3.610 | 0.025 | 0.688 |
| 2 | 2:1 | 0.229 | 0.1145 | 3.310 | | 3.260 | 0.050 | 1.51 |
| 3 | 4:1 | 0.164 | 0.0412 | 3.595 | | 3.525 | 0.070 | 1.95 |
| 4 | 4:1 | 0.164 | 0.0412 | 3.305 | 3.220 | 3.195 | 0.025 | 0.776 |
| 5 | 4:1 | 0.197 | 0.0492 | 3.500 | | 3.490 | 0.010 | 0.286 |
| 6 | 6:1 | 0.197 | 0.0328 | 3.490 | 3.430 | 3.400 | 0.030 | 0.875 |
| 7 | 8:1 | 0.130 | 0.0163 | 3.190 | 3.135 | 3.120 | 0.015 | 0.478 |
| 8 | 8:1 | 0.197 | 0.0246 | 3.920 | | 3.875 | 0.045 | 1.15 |
| 9 | 8:1 | 0.229 | 0.0286 | 3.560 | | 3.530 | 0.030 | 0.843 |
| 10 | 12:1 | 0.131 | 0.0109 | 3.260 | | 3.170 | 0.090 | 2.76 |
| 11 | 12:1 | 0.197 | 0.0164 | 3.295 | | 3.270 | 0.025 | 0.760 |
| 12 | 12:1 | 0.229 | 0.0191 | 3.410 | | 3.400 | 0.010 | 0.293 |
| 13 | (Check) | 0.000 | 0.000 | 3.240 | | 1.540 | 1.700 | 52.5 |
| 14 | (Check) | 0.000 | 0.000 | 3.570 | 3.565 | 2.085 | 1.480 | 57.7 |
| 15 | (Check) | 0.000 | 0.000 | 3.535 | 3.525 | 1.810 | 1.715 | 48.4 |

COMPOSITION C.—HALOPHENOL+CONDENSATION PRODUCT IN RATIO 4:1

| | Grams |
|---|---|
| Pentachlorophenol | 20.0 |
| Diethylenetriamine-formaldehyde (1:2.4) | [1] 9.95 |
| Propylene glycol monomethyl ether | 470.05 |

COMPOSITION D.—HALOPHENOL+CONDENSATION PRODUCT IN RATIO 6:1

| | Grams |
|---|---|
| Pentachlorophenol | 30.0 |
| Diethylenetriamine-formaldehyde (1:2.4) | [1] 9.95 |
| Propylene glycol monomethyl ether | 460.05 |

EXAMPLE 18

A concentrate composition was prepared as follows:

| | Weight percent |
|---|---|
| Pentachlorophenol | 20 |
| Piperazine-formaldehyde (1:1) | 10 |
| Propylene glycol monomethyl ether | 70 |

This composition was diluted with propylene glycol monomethyl ether to obtain treating compositions of varying concentrations and containing 0.6 percent, 0.3 percent and 0.15 percent by weight of pentachlorophenol. The above compositions were employed to treat wood blocks of southern yellow pine in the manner described in Example 16. The results are given in Table XII.

Table XII

| Sample | Ratio Pentachlorophenol/ Condensation Product | Concentration of Pentachlorophenol in Treating Composition in Weight Percent | Concentration of Condensation Product in Treating Composition in Weight Percent | Weight of Impregnated Block (Grams) | Weight of Block After Incubation (Grams) | Loss in Weight (Grams) | Percent Loss in Weight |
|---|---|---|---|---|---|---|---|
| 1 | 2:1 | 0.6 | 0.3 | 3.395 | 3.340 | 0.055 | 1.62 |
| 2 | 2:1 | 0.6 | 0.3 | 3.375 | 3.335 | 0.040 | 1.19 |
| 3 | 2:1 | 0.3 | 0.15 | 3.390 | 3.305 | 0.085 | 2.51 |
| 4 | 2:1 | 0.3 | 0.15 | 3.490 | 3.450 | 0.040 | 1.15 |
| 5 | 2:1 | 0.15 | 0.075 | 3.260 | 3.160 | 0.100 | 3.07 |
| 6 | 2:1 | 0.15 | 0.075 | 3.530 | 3.365 | 0.165 | 4.68 |
| 7 | 2:1 | 0.075 | 0.038 | 3.055 | 2.950 | 0.105 | 3.44 |
| 8 | | (Check) | | 3.330 | 1.950 | 1.380 | 41.5 |
| 9 | | (Check) | | 3.225 | 1.600 | 1.625 | 50.4 |

EXAMPLE 19

A composition suitable for antimicrobial application is prepared by adding pentachlorophenol to an ethylene glycol monomethyl ether solution of a condensation product obtained by treating 57 parts by weight of a mixture of aliphatic polyamines comprising about 75 percent diethylenetriamine and the remainder consisting predominantly of triethylenetetramine and tetraethylenepentaamine with 43 parts by weight of formaldehyde. The concentration of pentachlorophenol in the composition is 25 percent and the ratio of pentachlorophenol to the condensation product is 15:1.

We claim:
1. A composition comprising a combination of (1) a halophenol compound, said halophenol compound being selected from the class consisting of (a) halophenols, halocresols and halophenylphenols having the structure

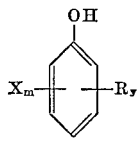

wherein R is selected from the group consisting of methyl and phenyl, each X is independently selected from bromine and chlorine, y is selected from 0 and 1, and m is an integer of from 1 to (5−y), inclusive, and (b) water-soluble salts of said halophenols, halocresols and halophenylphenols, and (2) a condensation product of a polyamine with a lower aliphatic aldehyde, said condensation product being selected from the group consisting of (a) the reaction product of from about 1.5 to 3.5 molar proportions of a lower aliphatic aldehyde containing from 1 to 4 carbon atoms, inclusive, with 1 molar proportion of an aliphatic polyamine having the structure

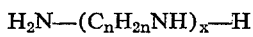

wherein n is an integer of from 2 to 3, inclusive, and x is an integer of from 1 to 4, inclusive, and (b) the reaction product of from about 0.8 to about 1.5 molar proportions of formaldehyde with 1 molar proportion of a piperazine compound having the structure

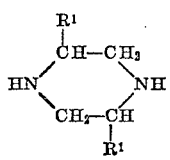

wherein each R¹ is selected from the group consisting of hydrogen and methyl; and wherein said composition contains an antimicrobial amount of the combination in a weight ratio of halophenol compound to condensation product of from about 12:1 to about 1:4.

2. A composition comprising a combination of (1) 2, 3, 4, 6-tetrachlorophenol and (2) a condensation product of a polyamine with a lower aliphatic aldehyde, said condensation product being selected from the group consisting of (a) the reaction product of from about 1.5 to about 3.5 molar proportions of a lower aliphatic aldehyde containing from 1 to 4 carbon atoms, inclusive, with 1 molar proportion of an aliphatic polyamine having the structure

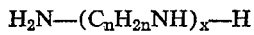

wherein n is an integer of from 2 to 3, inclusive, and x is an integer of from 1 to 4, inclusive, and (b) the reaction product of from about 0.8 to about 1.5 molar proportions of formaldehyde with 1 molar proportion of a piperazine compound having the structure

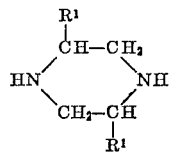

wherein each R¹ is selected from the group consisting of hydrogen and methyl; and wherein said composition contains an antimicrobial amount of the combination in a weight ratio of 2, 3, 4, 6-tetrachlorophenol to condensation product of from about 12:1 to about 1:4.

3. A composition comprising a combination of (1) pentachlorophenol and (2) a condensation product of a polyamine with a lower aliphatic aldehyde, said condensation product being selected from the group consisting of (a) the reaction product of from about 1.5 to 3.5 molar proportion of a lower aliphatic aldehyde containing from 1 to 4 carbon atoms, inclusive, with 1 molar proportion of an aliphatic polyamine having the structure

wherein n is an integer of from 2 to 3, inclusive, and x is an integer of from 1 to 4, inclusive, and (b) the reaction product of from about 0.8 to about 1.5 molar proportions of formaldehyde with 1 molar proportion of a piperazine compound having the structure

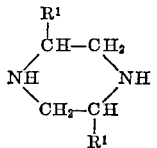

wherein each R¹ is selected from the group consisting of hydrogen and methyl; and wherein said composition contains an antimicrobial amount of the combination in a weight ratio of pentachlorophenol to condensation product of from about 12:1 to about 1:4.

(References on following page)

References Cited by the Examiner

UNITED STATES PATENTS

| | | | |
|---|---|---|---|
| 2,033,092 | 3/36 | Bruson | 117—138.5 |
| 2,045,517 | 6/36 | Bruson | 167—31 |
| 2,260,967 | 10/41 | Bruson | 117—138.5 |
| 2,535,475 | 12/50 | Anderson | 167—42 |
| 2,545,692 | 3/51 | Gleim | 167—42 |
| 2,635,083 | 4/53 | Cordier | 167—42 |
| 2,637,661 | 5/53 | Benignus | 167—38.7 |
| 2,789,060 | 4/57 | Spangenberg et al. | 167—42 |
| 2,838,425 | 6/58 | Lutz et al. | 117—138.5 |
| 2,849,486 | 8/58 | Tousignant | 167—42 |
| 3,081,221 | 3/63 | Moyle et al. | 167—31 |

FOREIGN PATENTS 749,324 5/56 Great Britain.

JULIAN S. LEVITT, *Primary Examiner.*

MORRIS O. WOLK, LEWIS GOTTS, *Examiners.*